United States Patent [19]
Melody et al.

[11] Patent Number: 6,149,793
[45] Date of Patent: *Nov. 21, 2000

[54] METHOD AND ELECTROLYTE FOR ANODIZING VALVE METALS

[75] Inventors: Brian J. Melody, Greer; John T. Kinard; Philip M. Lessner, both of Simpsonville, all of S.C.

[73] Assignee: Kemet Electronics Corporation, Greenville, S.C.

[ * ] Notice: This patent issued on a continued prosecution application filed under 37 CFR 1.53(d), and is subject to the twenty year patent term provisions of 35 U.S.C. 154(a)(2).

[21] Appl. No.: 09/090,164

[22] Filed: Jun. 4, 1998

[51] Int. Cl.[7] .................................................. C25D 11/02
[52] U.S. Cl. ......................... 205/234; 205/322; 205/324
[58] Field of Search .................................. 205/106, 107, 205/108, 234, 318, 322, 332; 252/62.2, 567; 510/414

[56] References Cited

U.S. PATENT DOCUMENTS

| | | | |
|---|---|---|---|
| 3,359,191 | 12/1967 | Minami et al. | 205/171 |
| 3,796,644 | 3/1974 | Bernard | 205/332 |
| 4,066,516 | 1/1978 | Sato | 205/121 |
| 4,196,060 | 4/1980 | Patrie et al. | 205/50 |
| 4,383,897 | 5/1983 | Gillich et al. | 205/50 |
| 4,388,156 | 6/1983 | Gillich et al. | 205/235 |
| 4,715,976 | 12/1987 | Mori et al. | 252/62.2 |
| 5,093,022 | 3/1992 | Sotoya et al. | 252/102 |
| 5,385,662 | 1/1995 | Kurze et al. | 205/316 |
| 5,472,788 | 12/1995 | Beniter-Garriga | 428/472.2 |
| 5,587,871 | 12/1996 | Ue et al. | 361/504 |
| 5,811,194 | 9/1998 | Kurze et al. | 428/469 |
| 5,837,121 | 11/1998 | Kinard et al. | 205/322 |

FOREIGN PATENT DOCUMENTS

| | | | |
|---|---|---|---|
| 537474 | 6/1941 | United Kingdom | 429/241 |
| 90/09685 | 8/1990 | WIPO . | |

OTHER PUBLICATIONS

Melody et al., "An Improved Series of Electrolytes for Use in the Anodization of Tantalum Capacitor Anodes," Presented at the Capacitor and Resistor Technology Symposium (C.A.R.T.S. '92), Mar. 17, 1992, pp. 1–11.
WPI Accession No. 85–315337 & SU 1158621 A DNEPR 30/05/85 (Abstract).
WPI Accession No. 96–285594 & RU2048615 C1 DNEPR 20/11/95 (Abstract).
Patent Abstracts of Japan JP57009897 SHOKO 19/01/82 (Abstract).
Patent Abstracts of Japan JP1255688 NISSHIN 12/10/89 (Abstract).

*Primary Examiner*—Kathryn Gorgos
*Assistant Examiner*—William T. Leader
*Attorney, Agent, or Firm*—Banner & Witcoff, Ltd.

[57] ABSTRACT

An electrolytic solution comprising glycerine and an organic salt, an inorganic salt, or mixtures thereof, and having a pH of less than about 7. The electrolytic solution has a water content of less than 0.1 weight percent and is prepared by mixing the glycerine and the salt or their acidic and basic ionogen components and heating to above 150° C. A method of anodizing a metal comprising forming a film on the metal with said electrolytic solution. The metal is preferably a valve metal, such as tantalum, and the film is formed at a temperature of 150° C. or higher.

7 Claims, No Drawings

METHOD AND ELECTROLYTE FOR ANODIZING VALVE METALS

BACKGROUND OF THE INVENTION

For over a century, the so-called "valve" metals (i.e., metals which form adherent, electrically insulating anodic oxide films, such as aluminum, tantalum, niobium, titanium, zirconium, silicon, etc.) have been employed for film applications. These applications include electrolytic capacitors, rectifiers, lightning arresters, and devices in which the anodic film takes the place of traditional electrical insulation, such as special transformers, motors, relays, etc.

When biased positively in appropriate (i.e., non-corrosive) aqueous or partially aqueous electrolytes, typical valve metals, such as aluminum or tantalum become coated with a dielectric film of uniform thickness. At constant temperature, the film thickness is proportional to the applied voltage and the rate of film growth is directly proportional to the current density. These properties are described at length in L. Young's book, "Anodic Oxide Films" (1961, Academic Press, London). Additionally, the thickness of anodic films at constant voltage is directly proportional to the absolute (Kelvin) temperature of the electrolyte. This was demonstrated by A. F. Torrisi ("Relation of Color to Certain Characteristics of Anodic Tantalum Films", *Journal of the Electrochemical Society* Vol. 102, No. 4, April, 1955, pages 176–180) for films on tantalum over the temperature range of 0° C. to 200° C. and with applied voltages up to 500 volts, presumably with the glycol-borate electrolytes in use at the time (these electrolytes always contain some free water, produced by esterification, which supplies oxygen for film formation).

The above relationships of voltage, temperature, current density and anodic film thickness have been successfully exploited by the manufacturers of electrolytic capacitors to obtain anodic films of different thickness according to the finished device voltage and capacitance requirements.

Anode foil for aluminum capacitors is usually anodized, following suitable etching processes to increase surface area, by slowly passing the foil through a series of anodizing tanks, each biased progressively more negative vs. the aluminum foil. The slow rate of transit of the foil through each tank allows the anodic film to reach the limiting thickness for the voltage difference between the foil and each tank of electrolyte.

In the manufacture of tantalum capacitors, powder metallurgy techniques are used to produce slug-like capacitor bodies of significantly less than theoretical density and having high internal surface area. The anodic dielectric film is produced by immersing the capacitor bodies in an electrolyte and applying current (usually a constant current) until the desired voltage is reached and then holding the anode bodies at this voltage for a time sufficiently long to insure a uniform film thickness within the interstices of the anode bodies.

Upon application of suitable cathode contacts, anode materials covered with anodic films as described above, become positive capacitor "plates" in polar capacitors in which the anodic film serves as the dielectric. These devices are characterized by a relatively high capacitance per unit volume and relatively low cost per unit of capacitance compared with electrostatic capacitors.

These devices are also "polar" devices, which show so-called "valve" action, blocking current within the rated voltage range when the valve metal is positively biased and readily passing current if the valve metal is biased negative (early rectifiers were based upon this fact and contained aluminum or tantalum as the valve metal).

It is readily apparent that modifications of the anodizing process resulting in anodic oxide films having high dielectric constant and low film thickness per volt are advantageous as they tend to maximize capacitance per surface area of valve metal at a given anodizing voltage. C. Crevecoeur and H. J. DeWit, in a paper entitled: "The Influence of Crystline Alumina on the Anodization of Aluminum" (Presented at the Electrochemical Society Meeting in Seattle, Wash. May 21–26, 1978) report that aluminum anodized in very dilute citric acid solutions gives rise to a "crystalline" anodic oxide with a thickness of 8 angstroms per volt, while the film produced in traditional dilute borate electrolytes has a thickness of 11 angstroms per volt. This results in an approximate 30% capacitance advantage for the films produced in the carboxylic acid solution.

The dielectric properties (i.e., withstanding voltage, dielectric constant) of the anodic film appear to be influenced to an extraordinary degree by the presence of even a small amount of carbonaceous material incorporated during anodizing.

U.S. Pat. 4,159,927 indicates that anodizing electrolytes containing small quantities of hydroxy-carboxylic acids (e.g., tartaric acid, malic acid, citric acid, etc.) in addition to the major boric acid solute give rise to anodic films on aluminum containing less than 1% carbon, but having profoundly different diffusion properties as indicated by their much lower rate of reaction with water to form hydrated species compared with traditional films containing no carbonaceous species. In aqueous electrolytes containing minor amounts of hydroxy-carboxylic acids, the incorporated carbonaceous species originates with the carboxylic acid carbon. This is not necessarily true for all electrolytes, however.

Solutions of boric acid in formamide give rise to anodic films on aluminum at 60–100° C. which contain a significant amount of incorporated carbonaceous species ("Properties and Mechanism of Formation of Thick Anodic Oxide Films on Aluminum from the Non-Aqueous System Boric Acid-Formamide", S. Tajima, N. Baba, and T. Mori, *Electro Chemical Acta*, 1964, Vol. 9, pages 1509 to 1519).

G.B. 2,168,383A describes an anodizing process employing aprotic polar solvent solutions of phosphoric acid or soluble amine phosphate, operated below about 30° C. Anodic films formed on titanium coupons in these electrolytes have been demonstrated to contain incorporated carbonaceous material. ("Anodizing Mechanism in High Purity Titanium", H. W. Rosenberg, M. S. Cooper, and Karl Bloss; presented at the "Titanium '92" 7th International Conference on Titanium, San Diego, Calif, 1992).

More recently, Ue, et al. have demonstrated that anodic films on aluminum anodized in anhydrous (about 10 ppm water) 4-butyrolactone containing quaternary ammonium salts exhibit a dielectric constant enhancement of as much as 10 to 20 times higher than that obtained with traditional aqueous anodizing electrolytes (Japanese Patent No. 8-134693). These authors have extended this anodizing method to include anhydrous solutions of quaternary ammonium salts of oxygen-containing mineral acids in ethylene glycol and have obtained a similar, though less pronounced elevation of the dielectric constant of anode films on aluminum (Japanese Patent No. 8-134,692). These authors have also claimed in the technical paper, "Anodic Oxidation of Valve Metals in Non-Aqueous Electrolyte Solutions", (Electrochemical Society Proceedings, Vol. 96–18, pages 84–95) to have extended this anodizing method to titanium, zirconium, hafnium, niobium, and tantalum, but give no supporting data for this claim. The anodic film growth in the electrolytes of Ue, et al. is traditional so far as the anodizing kinetics are concerned, with the film growing to a thickness dependent upon voltage.

The elevated dielectric constant of anodic films grown on titanium in low water content phosphate solutions in 4-butyrolactone was disclosed in G.B. 2,168,383A, in example no. 4, in which a dielectric constant of 8 times that of traditionally formed tantalum oxide was produced at 100 volts. In a further preferred embodiment, disclosed in example No. 7, anodic titanium oxide produced at 500 volts in a low water content phosphate solution in N- methyl-2-pyrrolidone gave a capacitance of over 30 times that of an equal surface area of tantalum anodized to 500 volts in a traditional electrolyte.

Unfortunately, all of the above anodizing methods which give rise to an elevation of the dielectric constant of the anodic oxide have major drawbacks or limitations when used in a production scale anodizing process. Quaternary ammonium salts are expensive and difficult to obtain. Amines, such as pyridine and the picolines, which form electrolytesoluble phosphate salts tend to be toxic and to have very unpleasant odors. Many of the most suitable solvents, such as 4-butyrolactone, N-alkyl-2-pyrrolidones, dimethyl formamide, dimethyl sulfoxide, etc., are toxic, flammable or are difficult to contain in standard anodizing equipment due to attack of circulation pump seals, etc.

Furthermore, it is very difficult to maintain polar solvent-based electrolytes in an anhydrous condition in a production environment. The reduction in anodic film breakdown voltage and anodizing efficiency for aprotic solvent phosphate solutions containing more than about 2% water are described in G.B. 2,168,383A, while Ue, et al. describes a factor of three difference in oxide thickness per volt with a 300 ppm increase in electrolyte water content (Electrochemical Society Proceedings paper cited earlier, page 86).

The expedient of simply heating the anodizing electrolytes to temperatures above the boiling point of water to drive off moisture is impractical due to excessive solvent evaporation, increased possibility of fires, loss of volatile amines, and reaction of the solvents with the solutes. At higher temperatures, 4butyrolactone reacts with amines and phosphates, dimethyl sulfoxide is converted into dimethyl sulfide and dimethyl sulfone and alkyl amides react with phosphates to form phosphoramides, etc.

The simple expedient of employing the methods and solvents, etc., of G.B. 2,168,383A and replacing the phosphoric acid with polyphosphoric acid to reduce the water content has been attempted (U.S. Pat. No. 5,211,832) and, unfortunately, has been found to lead to the production of anodic titanium dioxide films having a dielectric constant of about 20. This value is several times less than that obtained with phosphoric acid according to G.B. 2,168,383A.

It is desired to provide an anodizing electrolyte or series of electrolytes which have the ability to produce anodic films having high dielectric constant and few flaws. It is also desired to have high thermal stability so that the water content can be maintained at sufficiently low levels with the aid of heat alone (i.e., no need for vacuum-treatment, etc.). In addition it is desired to have safe, low-toxicity, low-objectionable odor components and a near-neutral pH (i.e., a "worker-friendly" composition) and low-cost components (to make mass production affordable). Also desired is inherent stability of composition over the operating life so as to avoid the need for frequent analysis and component additions to maintain the electrolyte composition and relatively low resistivity so as to produce anodic films of uniform thickness with varying separation between anode and cathode surfaces.

Related application Ser. No. 08/948,783, now U.S. Pat. No. 5,837,121, describes the use of electrolytes consisting of solutions of dibasic potassium phosphate dissolved in glycerine and containing less than 0.1 wt. % water. When these electrolytes are maintained above about 150° C., they may be used to produce anodic oxide films on valve metals which grow indefinitely thicker with time so long as constant voltage is applied. These electrolytic solutions have pH values higher than 7. Solutions of dibasic potassium phosphate have also been found to be very stable with respect to resistance to polymerization of the glycerine in spite of the alkaline pH values of these solutions.

Other salts which give alkaline solutions with glycerine, such as potassium acetate, potassium formate, potassium bicarbonate, sodium bicarbonate, lithium formate, and sodium salicylate have been found to give glycerine-based electrolytes which initially may be used to produce anodic films in the same non-thickness-limited fashion as the dibasic potassium phosphate solution described in related Ser. No. 08/948,783.

With the exception of dibasic potassium phosphate, the use of salts which give an alkaline solution in glycerine leads to the production of unstable solutions, in which the glycerine polymerizes in the manner described by Miner and Dalton in A.C.S. monograph, *Glyerol* (Reinhold Publishing Corp., N.Y., 1953, 366–369). This polymerization, which destroys the non-thickness limited anodizing action, is accompanied by an increase in electrolyte viscosity and resistivity; the resistivity generally rises by a factor of 3 or more within 2 or 3 days.

SUMMARY OF THE INVENTION

The present invention is directed to an electrolytic solution having a pH less than about 7 and comprising glycerine and an organic salt, an inorganic salt, a mixture thereof. The present invention is further directed to an electrolytic solution having a water content of less than 0.1 wt %. In addition, the present invention is directed to an electrolytic solution prepared by mixing the glycerine and the salts or their acidic and basic ionogens and then heating the solution to above 150° C.

The present invention is also directed to a method of anodizing a metal comprising forming a film on the metal said electrolytic solution. The metal is preferably a valve metal, such as tantalum, and the film is formed at a temperature of 150° C. or higher.

It is to be understood that both the foregoing general description and the following detailed description are exemplary and explanatory only and are not restrictive of the present invention as claimed.

DETAILED DESCRIPTION OF THE PREFERRED EMBODIMENTS

The present invention is directed to the production of anodic oxide films on valve metals via anodic polarization in a liquid electrolyte under conditions which result in the production of adherent, coherent, non-porous films of unlimited thickness at a fixed and relatively low (less than 100 volts) D.C. potential. This type of "non-thickness limited" anodizing stands in contrast to traditional anodizing, which produces anodic films having a thickness in direct proportion to the applied voltage and absolute temperature of the electrolyte.

The present invention is directed to glycerine-based electrolytes having a pH of less than about 7 which are useful for non-thickness limited anodizing above 150° C. Due to its low pH, the electrolytes of the present invention are not susceptible to polymerization of the glycerine.

The electrolytes are produced by dissolving an organic acid salt, an inorganic acidic salt, or mixtures thereof in glycerine or by producing acidic salts in situ via addition of acidic and basic ionogen components to the glycerine. By mixtures thereof 4 it is meant a mixture of acidic salts, a mixture of basic salts, or a mixture of acidic and basic salts. The solution is then heated to above about 150° C. and the water content is reduced to below 0.1 wt %. The electrolyte may then be used to grow non-thickness limited anodic oxide films.

The pH level is below about 7, and preferably between about 5 and 6.

Suitable organic and/or inorganic acidic salts include sodium P-toluene sulfonate, potassium hydrogen sulfate and monobasic potassium tartrate.

Alternatively, suitable acidic salts are formed in situ via addition of acidic and basic ionogen components. The salt nature of the ionogen prevents consumption of the acidic component of the electrolyte in the production of esters with the elimination of water as occurs with straight acid solutions above 150° C. Preferably an organic salt is combined with a non-volatile organic or inorganic acid. Suitable salts include potassium acetate, sodium bicarbonate and potassium formate. Suitable inorganic acids include sulfonic acid. Suitable organic acids include P-toluene sulfonic acid and tartaric acid. Preferably potassium acetate is mixed with sulfuric or tartaric acid.

The electrolytic solution of the present invention may be used to produce anodic films on most types of metals including "valve" metals such as aluminum, tantalum, niobium, titanium, zirconium, silicon. Tantalum is the most common valve metal used.

Anodic films, prepared with the electrolytic solution of the present invention, may be produced at constant voltage, with the film thickness being approximately proportional to the time held at voltage at a constant temperature above about 150° C. The rate of film growth in these solutions is a function of both the applied voltage and electrolyte temperature. There is no known upper limit to the thickness of a film produced in accordance with the present invention.

Film growth rate is dependent on applied voltage with the electrolytes and anodizing conditions of the present invention. Tantalum powder metallurgy capacitor anode bodies that are anodized with constant voltage and direct current result in the formation of an outer anodic film which is much thicker than the anodic film covering the internal anode surfaces C., on the internal surfaces the anodic film grows at a lower rate due to the voltage drop through the electrolyte within the interstices of the anode bodies). This differentiation of film thickness with a thicker anodic film covering the outer envelope of the anode body may be employed to advantage for the purposes outlined in U.S. Pat. No. 4,131,520, which is hereby incorporated by reference, namely the production of a thick outer film which is resistant to mechanical damage and electrical field stress, while maintaining a relatively thin internal film thickness to maximize device capacitance.

There are unlimited applications for the electrolytic solution of the present invention including the production of electrolytic capacitors, rectifiers, lightning arresters, and devices in which the anodic film takes the place of traditional electrical insulation, such as special transformers, motors, relays, etc. In addition, because of the uniformity obtained with the present invention, the electrolytic solution of the present invention may be used in the production of surgical implants where a minimum of induced currents is desirable. The rapid rate of growth achieved with the present invention also allows for the production of practical anti-seize coatings for connectors and plumbing fabricated from valve metals and alloys.

EXAMPLES

The invention will be further described by reference to the following examples. These examples should not be construed in any way as limiting the invention.

Example 1

This example compares the anodizing behavior of an acidic salt in glycerine electrolyte to a dibasic potassium phosphate in glycerine electrolyte and shows that the anodizing behavior is similar. An acidic salt electrolyte was prepared in situ by dissolving 5.1 grams of potassium acetate (approximately $\frac{1}{20}$ mole) and 4.9 grams of concentrated sulfuric acid (approximately $\frac{1}{20}$ mole) in 280 grams of 99.7% synthetic glycerine in a 250 ml stainless steel beaker. The solution was heated to 190° C. The electrolyte initially had a pH of approximately 2, as indicated by pHydrion test paper. The pH rose to approximately 4 after standing at 180°–190° C. for 2 hours.

The electrolyte was used to anodize a tantalum foil coupon at 30 volts. After 45 minutes at 180–190° C., the oxide was found to be equivalent in thickness to an oxide produced at 75 volts at 85° C. The coupon was returned to the electrolyte and non-thickness limited anodizing behavior continued with increasing current (from 1 milliampere to 10.7 milliampere) to a total time of 2 hours 23 minutes at a temperature of 175°–180° C. The addition of approximately 0.2 weight percent water resulted in an immediate current reduction, from 10.7 to less than 4.0 milliamperes.

Example 2

This example shows that the acidic salt electrolyte in Example 1 does not polymerize the glycerine and that the non-thickness limited anodizing behavior is present. The electrolyte in Example 1 was held at 150° C.±15° C. for 3 days. The electrolyte was then used to anodize a tantalum coupon at 30 volts and a temperature of 151°–152° C. After 2 hours, the oxide film thickness was equivalent to the thickness produced by conventional anodizing methods at 95–100 volts at 85° C.

Example 3

This example demonstrated the non-thickness limited and uncorroded film development using an acidic tartaric electrolyte on an aluminum coupon.

| Time (minutes) | Current (mA) |
|---|---|
| 5 | 0.61 |
| 10 | 0.55 |
| 15 | 0.59 |

-continued

| Time (minutes) | Current (mA) |
| --- | --- |
| 30 | 0.74 |
| 45 | 0.72 |
| 60 | 0.75 |
| 90 | 0.82 |
| 100 | 0.89 |

The electrolyte of Example 1 was found to give some pitting attack on aluminum coupons at 170°–180° C. An acidic tartarate electrolyte (tartarate is known to be much less aggressive toward aluminum then sulfate with respect to corrosion) was prepared by dissolving 5 grams of potassium acetate (approximately 1/20 mole) and 7.5 grams of tartaric acid (approximately 1/20 mole) in 275 grams of glycerine contained in a 250 ml stainless steel beaker. The solution was heated to 190° C. Initially, the pH was found to be approximately 3 with pHydrion paper. The electrolyte was held at 150° C. overnight and the pH was then found to be approximately 6.

The electrolyte was used to anodize an aluminum coupon, 1"×3", (Baker 99.9%) to 30 volts at 174°–182° C. The above listed current data demonstrated the non-thickness limited anodizing and the film was found to be transparent and pore-free (uncorroded).

Example 4

This example illustrates the necessity of having an ionogen present in the glycerine-based electrolyte. A tantalum coupon was immersed in glycerine contained in a 250 ml stainless steel beaker. The tantalum coupon was biased positive and 30 volts applied while maintaining the temperature at 180° C.±15° C. for 1.5 hours, then at 150°–160° C. for an additional 18 hours, 10 minutes. The tantalum coupon was found not to be anodized, except for some corrosion products around the edges.

Example 5

This example illustrates the non-thickness limited film growth for another glycerine and acidic salt electrolyte. An electrolyte was prepared by dissolving 1 grain of sodium P-toluene sulfonate in 285 grams of glycerine. The pH of the electrolyte solution was approximately 5 when measured with pHydrion paper. The 1kHz resistivity was 2,040 ohm-cm/160° C. This electrolyte was used to anodize a tantalum coupon to 30 volts at 168°–170° C. After 20 minutes, the oxide thickness was found to be equivalent to that produced by conventional anodizing at 105–110 volts and 85° C.

Example 6

This example illustrates the stability of acidic salt solutions in glycerine with respect to resistance to glycerine polymerization. The electrolyte in Example 5 was stored at 160° C.±10° C. for 9 days. The electrolyte was then used to anodize a tantalum coupon to 30 volts at 154° C. After 30 minutes, the oxide was found to be equivalent in thickness (indicated by comparison to oxide color heart having anode specimens anodized to various voltages at 85° C.) to that produced using conventional anodizing at 60–65 volts and 85° C. The expected voltage at 154° C. for conventional anodizing is given by the following formula:

$$V_2 = V_1(T_2/T_1) = (30)(427/358) = 36 \text{ volts}$$

where: $V_1 = 30$ volts
$V_2$ = expected voltage
$T_1 = 358°$ K (85° C.)
$T_2 = 427°$ K (154° C.)

Thus, the 60–65 volts observed thickness is much greater than the 36 volts expected thickness for conventional anodizing. This shows the non-thickness limited behavior is present and pronounced.

After storage of 2 additional days at 135° C., the electrolyte was found to have a pH of approximately 5 after measurement with pHydrion paper and a 1 kHz resistivity at 160° C. of 2040 ohm-cm. These properties are virtually identical to the same properties for a freshly prepared electrolyte.

Example 7

This example shows that the resistivity of acidic salt solutions may be reduced to convenient levels for commercial use by increasing the salt concentration.

| Amount of Sodium P-toluene Sulfonate in 285 g of glycerin (g) | 1 kHz resistivity (ohm-cm/160° C.) |
| --- | --- |
| 1 | 2040 |
| 5 | 420 |
| 10 | 250 |

It will be apparent to those skilled in the art that various modifications and variations can be made in the compositions and methods of the present invention without departing from the spirit or scope of the invention. Thus, it is intended that the present invention covers the modifications and variations of this invention provided they come within the scope of the appended claims and their equivalents.

What is claimed:

1. An electrolytic solution comprising glycerine and at least one acidic organic salt, inorganic salt, or mixtures thereof, wherein the solution has a pH of at least 4 and less than 7 and is heated to above 150° C. to obtain a water content less than 0.1 wt % wherein the acidic salt is P-toluene sulfonate.

2. An electrolytic solution comprising glycerine and at least one acidic organic salt, inorganic salt, or mixture thereof, wherein the solution has a pH less than 7 and a water content less than 0.1 wt % and is produced via addition of acidic and basic ionogen components to glycerine and heating the solution to above 150° C.

3. The electrolytic solution according to claim 2 comprising potassium acetate and sulfuric or tartaric acid.

4. A method of anodizing a metal comprising forming a film on the metal with an electrolytic solution comprising glycerine and at least one acidic organic salt, inorganic salt, or mixture thereof, wherein the solution has a pH less than 7 and a water content less than 0.1 wt %.

5. The method according to claim 4 wherein the metal is a valve metal.

6. The method according to claim 5 wherein the metal is tantalum.

7. The method according to claim 4 further comprising forming the film at a temperature of 150° C. or higher.

* * * * *